May 19, 1970    E. J. KOLLASCH ET AL    3,512,841
METHOD AND APPARATUS FOR CONVEYING PARTICULATE MATERIAL
UTILIZING A GASEOUS CONVEYING MEDIUM
Filed March 28, 1968    2 Sheets-Sheet 1

INVENTORS
EDWARD J. KOLLASCH
ROBERT B. EMERY

BY *Burns, Doane, Benedict, Swecker & Mathis*

ATTORNEYS

INVENTORS
EDWARD J. KOLLASCH
ROBERT B. EMERY

ATTORNEYS

United States Patent Office
3,512,841
Patented May 19, 1970

3,512,841
METHOD AND APPARATUS FOR CONVEYING PARTICULATE MATERIAL UTILIZING A GASEOUS CONVEYING MEDIUM
Edward J. Kollasch and Robert B. Emery, Duncan, Okla., assignors to Halliburton Company, Duncan, Okla., a corporation of Delaware
Filed Mar. 28, 1968, Ser. No. 716,800
Int. Cl. B65g 53/40
U.S. Cl. 302—51         9 Claims

ABSTRACT OF THE DISCLOSURE

A method of conveying particular material from a mass thereof, which utilizes a nozzle and a venturi tube, with a convergent entry passage of the venturi tube positioned downstream of and facing toward a divergent exit passage of the nozzle. The method includes the steps of passing gas from a pressure source through the nozzle to provide a divergent gas stream directed into the venturi tube, thus creating a suction zone between the nozzle and the venturi tube. The suction zone is placed in fluid communication with a quantity of the particulate material to cause particles of the material to be drawn into and become entrained in the gas stream. Gas is supplied under pressure to the mass of material to replace at least a portion of the interstitial air present between the particles in the mass withdrawn in the suction zone, to prevent compaction of the material. The gas stream is then passed into a downstream divergent passage of the venturi tube to provide a pressure build-up to assist in removal of the entrained material to a subsequent location.

An apparatus for delivering particulate material from a mass thereof utilizing a supply of gas under pressure, which includes a nozzle and a venturi tube. The nozzle is adapted to be connected to the source of gas and includes a divergent downstream passage for directing a divergent gas stream into a converging passage of the venturi tube. The entry passage of the venturi tube is adapted to be positioned within the mass of particulate material thus placing a suction zone, between the nozzle and tube, in fluid communication with the material so that particles thereof are drawn into and entrained in the gas stream. Aerating means are provided to supply air to the mass of material to replace at least a portion of the interstitial air between the particles in the mass withdrawn into the suction zone, to prevent compaction of the material. The gas stream passes into a divergent exit passage of the venturi tube to cause a pressure build-up to assist in subsequent removal of the entrained material.

BACKGROUND OF INVENTION

This invention relates to a method and apparatus for conveying particulate material. In particular, the invention relates to a method and apparatus utilizing a gas stream to entrain and convey the particulate material.

In moving particulate material, such as for example, sand, dry cement or the like, from bulk it may sometimes be advantageous to utilize a conveying system utilizing a gaseous conveying medium. Such systems may commonly include a nozzle facing into an open end of a conveying conduit. A stream of gas may be projected through the nozzle to provide a low pressure suction zone at the entrance to the conduit for drawing particles of the material from the mass of the material into the gas stream. The entrained particles are then conveyed away by the gas stream.

Although systems of this type are often satisfactory, certain significant disadvantages may however be encountered during their operation.

For example, the suction created by the gas stream leaving the nozzle may often be sufficiently great to exhaust some of the interstitial air normally present between the particles of material in the mass at a greater rate than that at which the particles are drawn into the conduit. In this event, the material may become compacted, thus losing much of its mobility with the result that it becomes bridged over the entrance to the conveying conduit thereby hindering or preventing entrainment of further particles of material. The result of such bridging is likely to be, at the very least, a substantial reduction in the rate of delivery of particulate materials.

Another problem with previous systems of the type described, is that the gas stream leaving the nozzle may tend to pass centrally straight down the conveying conduit without impingement upon the walls thereof until a substantial distance downstream of the entrance. In this event, there may be a gaseous dead zone between the conveying gas stream and the walls of the conveying conduit. The action of the gas stream on the gas in this dead zone may be such as to tend to produce swirling counter currents and eddies in which portions of the entrained material may separate out or in which portions of the entrained material may even be carried back upstream of the conduit. Either of such results obviously represents a loss of conveying efficiency of the nozzle.

Another disadvantage of some previous systems is that there may sometimes be insufficient pressure head in the gas stream downstream of the opening of the conveyor conduit, to provide for elevating the entrained material to a subsequent location to which delivery is desired.

SUMMARY OF INVENTION

It is therefore a general object of the invention to provide a method and apparatus for conveying particulate material which obviates or minimizes problems of the type previously noted.

It is a particular object of the invention to provide a method and apparatus for conveying particulate material utilizing a gaseous conveying medium, wherein problems of compaction and bridging of the material due to removal of air therefrom are obviated or minimized.

It is another object of the invention to provide a method and apparatus for conveying particulate material utilizing a gaseous conveying stream, wherein problems of loss of conveying efficiency due to dead gas zones surrounding the conveying stream are reduced.

It is a further object of the invention to provide method and apparatus for conveying particulate material utilizing a gaseous conveying stream in which an adequate pressure head is provided for delivering the conveyed material to a remote or elevated location.

A method for conveying particulate material according to the present invention, intended to accomplish at least some of the foregoing objects utilizes a nozzle and a venturi tube, with a convergent entry passage of the venturi tube positioned downstream of and facing toward a divergent exit passage of the nozzle. The method includes the steps of passing gas from a source of gas under pressure through the nozzle into the venturi tube to provide a divergent gas stream creating a suction zone between the nozzle and venturi tube. In a further step, the entry passage of the venturi tube is placed in fluid communication with a mass of the material to cause some of the particles of the material to be drawn into the suction zone and become entrained in the gas stream. At the same time, gas under pressure is supplied to the mass of material to replace at least a portion of the interstitial air lost to the suction zone, to prevent compaction of the material. The gas stream is then passed into a downstream divergent passage of the venturi tube to cause a pressure build-up to assist in removal of the entrained material to a remote location.

An apparatus aspect of the invention resides in the provision of a nozzle having an entry opening adapted for connection to a source of gas under pressure. The nozzle includes a divergent exit passage, communicating with the entry portion, positioned downstream thereof for producing a divergent gas stream. The divergent gas stream is directed into a venturi tube, positioned downstream of the nozzle and having a convergent entry passage, to create a suction zone between the nozzle and venturi tube. The entry passage of the venturi tube is adapted to be placed in fluid communication with a mass of the particulate material to cause particles thereof to be drawn into the suction zone and become entrained in the gas stream. Aerating means is positioned externally of the venturi tube adjacent the entry passage thereof extending at least partially upstream. The aerating means supplies gas under pressure to the bulk mass of material to replace at least a portion of the interstitial air withdrawn into the suction zone. The venturi tube is further provided with a divergent passage downstream of the entry passage to cause a pressure build-up of the gas to assist in removal of the entrained material to a remote location.

In another apparatus aspect of the invention, conduit means is connected to the downstream end of the venturi tube to conduct the gas stream and entrained material away to the remote location.

THE DRAWINGS

Certain preferred embodiments of the invention are illustrated in the accompanying drawings in which.

DETAILED DESCRIPTION

Figure 1:
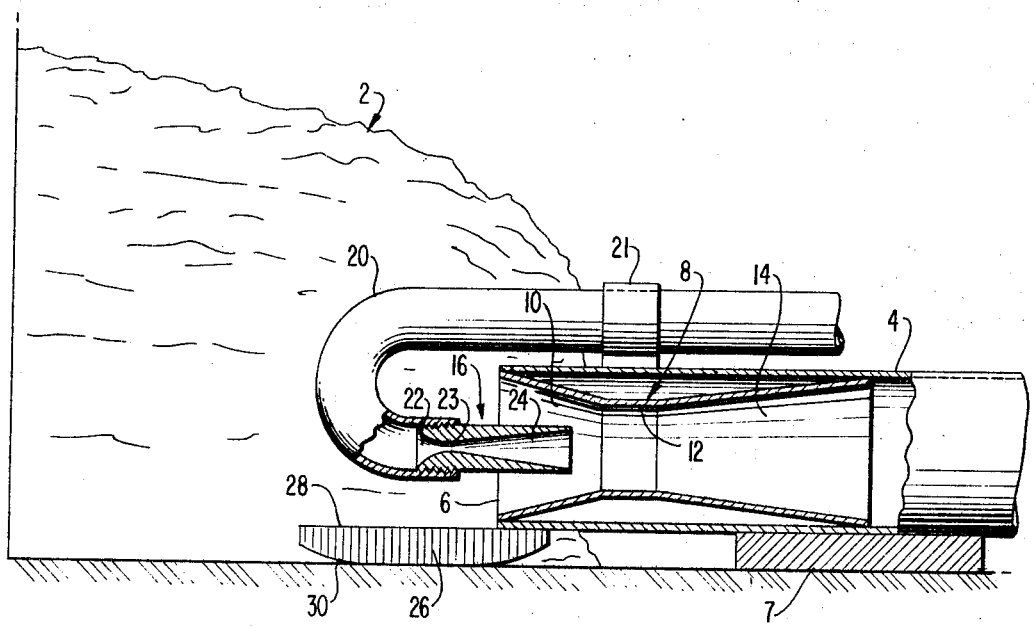
FIG. 1 is a cross-sectional side view of a conveying apparatus constructed in accordance with one preferred embodiment of the invention, showing the apparatus in use for removing particulate material from a heaped pile thereof lying on the ground.
Figure 2:
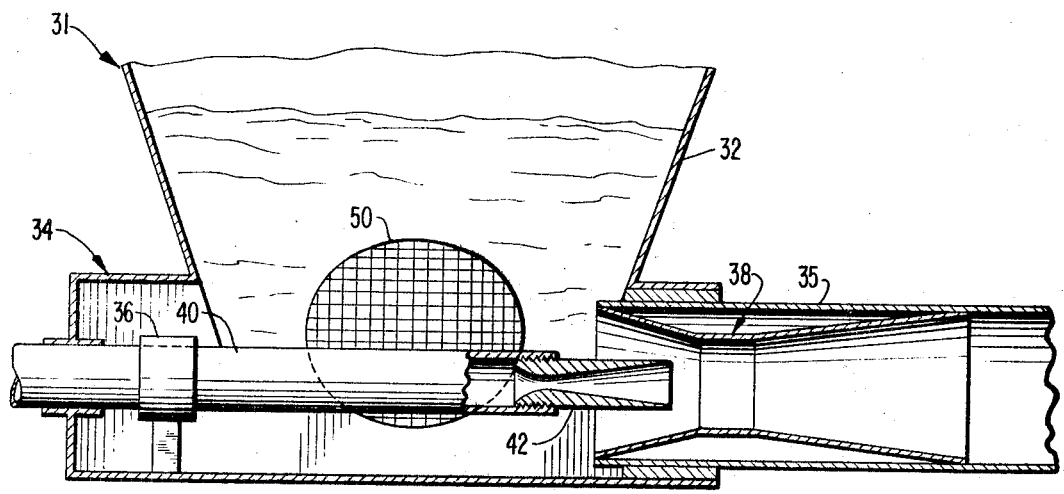
FIG. 2 is a cross-sectional side view of a second embodiment of the apparatus provided with a hopper for containing the particulate material.
Figure 3:
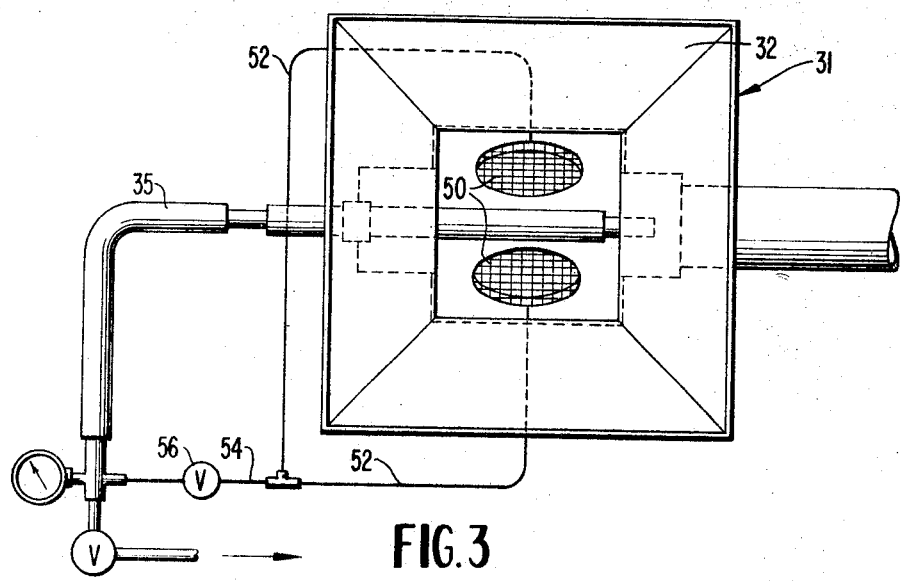
FIG. 3 is a top view of the apparatus shown in FIG. 2 with an additional showing of external apparatus for providing a supply of gas under pressure.
Figure 4:
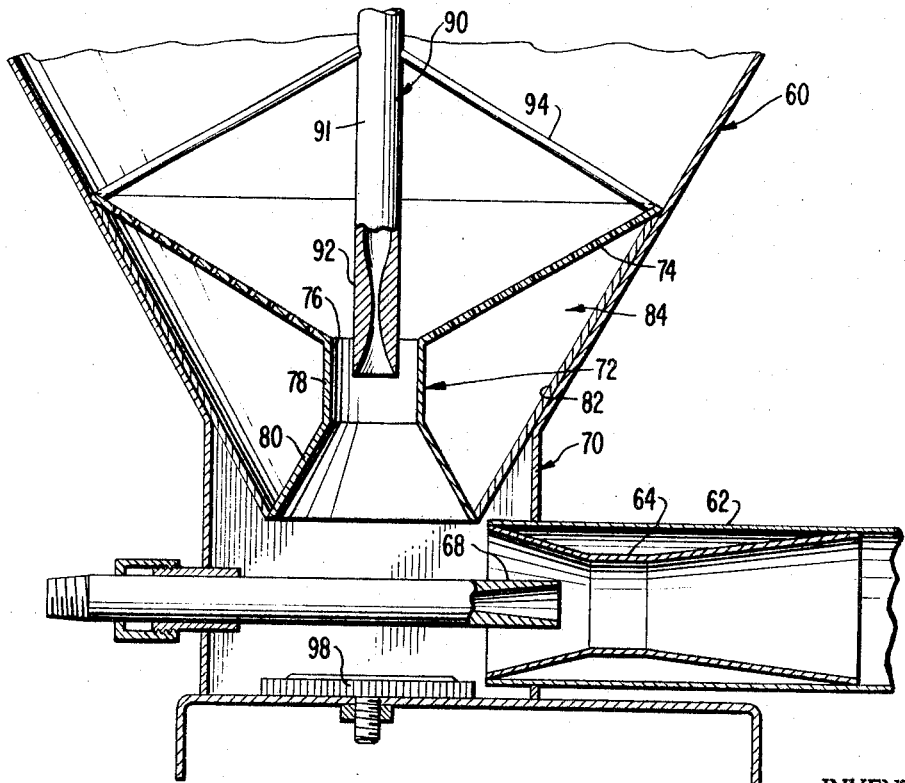
FIG. 4 is a cross-sectional side view of a third embodiment of the invention utilizing a hopper provided with a charger.

Referring to FIG. 1 of the drawings, a preferred embodiment of the invention there shown is intended to deliver particulate material (such as for example sand, dry cement, or other materials) from a pile 2 of the material heaped on the ground. The apparatus includes a horizontally disposed conveying conduit or tube 4 having an open forward end 6. The open end of the conduit 4 is forced into the pile 2 of material and is supported at a small elevation above the ground by a suitable support 7. The conduit 4 extends away to a remote location to which the particulate material is to be delivered.

Fixedly mounted in the conveying tube 4 adjacent the open end thereof is a venturi tube 8. The venturi tube 8 includes a shaped sheet metal, annular wall defining an entry passage 10 extending downstream from the open end 6 of the tube 4 and converging radially inwardly to a throat 12 of minimum diameter. Downstream of the throat 12, the venturi 8 includes an exit passage 14 diverging outwardly to a maximum diameter generally equal to that of the interior of the conveying tube 4.

A gas stream is directed into the venturi tube 8 through a nozzle 16 positioned upstream of and concentric with the venturi tube 8. Gas is supplied to the nozzle through a rigid hollow conduit 20 secured to the upstream end of the nozzle 16 with the remote end of the conduit being connected to a suitable source of gas under pressure (not shown). In the preferred embodiment the source of gas comprises an air compressor although other conventional gas sources such as for example cylinders of compressed gas, may be utilized.

The conduit 20 also serves to maintain the nozzle 16 in fixed location relative to the venturi tube 8. For this purpose, the conduit 20 is bent back upon itself to run parallel to the conveying tube 4 and is secured thereto by a conventional rigid mounting bracket 21.

The nozzle 16 is threaded on its external surface adjacent its upstream end to enable it to be threadedly engaged with corresponding, internally threaded portions of the conduit 20. Internally, the nozzle 16 is provided with an annular, axially extending passage having a convergent entry opening 22, a minimum diameter throat 23 and a divergent exit passage 24 of conoidal configuration. The exit passage 24 of the nozzle extends into the convergent entry passage 10 of the venturi tube with the downstream end of the exit passage 24 spaced upstream of the throat 12 of the venturi tube. The maximum diameter of the exit passage 24 is additionally of relatively smaller diameter than the throat 12.

The gas emerges from the exit portion 24 of the nozzle as a divergent gas stream which, by reason of its divergent character, substantially fills the throat 12 of the venturi tube. In addition, the gas stream in the area between the downstream end of the nozzle 16 and the throat 12 is at sub-atmospheric pressure to constitute a suction zone in which the gas is traveling at a relatively rapid velocity. Particles of the material are drawn into the suction zone through the open entry passage 10 of the venturi tube 8 from the mass 2 of material to become entrained in the gas stream. The portion of the pile 2 of material adjacent the open end of the venturi tube may thus be considered to constitute a region of entrainment from which particles are continuously withdrawn into the conveying conduit. Material thus removed from the region of entrainment is replaced by collapse of adjacent parts of the pile 2 into the position formerly occupied by the removed material.

However, the suction zone also tends to withdraw interstitial air, normally present between the particles in the mass 2, at a greater rate than the particles with the result that the material remaining in the pile 2 in the region of entrainment might tend to become compacted. In this event, the compacted material loses much of its mobility and may form an arch or bridge over the opening to the conveyor tube preventing collapse of additional material into the region of entrainment to replace that removed, thus reducing the flow of material.

To prevent this possibility, air is supplied to the mass of material under pressure (to replace the free air sucked out from between the particles into the suction zone) through an aeration pad 26. The aeration pad 26 is initially forced into the pile until a flat, foraminous upper surface 28 of the aeration pad 26 is positioned beneath and closely adjacent the upstream end of the conveyor tube 4 projecting upstream therefrom. A hollow housing 30 is secured to the underside of the foraminous sheet 28, with the lower surface of the housing 30 resting on the ground. Air is supplied to the interior of the housing 30 by conventional air pressure supply means (not shown) and issues through the foraminous sheet 28 under pressure but diffused over a relatively large area. In this way, the particulate material adjacent the region of entrainment is maintained in an uncompacted state so that it may continue to feed easily into the venturi tube without bridging or other adverse effects.

As previously mentioned the diverging gas stream leaving the divergent passage 24 of the nozzle 16 impinges upon the converging entry portion and throat of the venturi tube 8 in such a manner as to ensure that the gas stream completely fills the channel within which it is confined. This prevents the development of dead zones between the conveying gas stream and the walls of the conveying tube in which some of the entrained material might settle out, or in which gas eddies might develop carrying portions of the entrained material counter current in an upstream direction. In this way, the conveying efficiency of the nozzle and venturi tube combination is enhanced while at the same time the provision of air through the aerating pad assures that this enhanced conveying capacity is not reduced by unwanted bridging of the material.

Downstream of the throat 12, the gas stream passes into the divergent exit passage 14 of the venturi tube 8 in which the velocity of the gas stream is slowed and the pressure consequently built up. The pressure build-up is necessary in order to provide a sufficient pressure head to impel the entrained material to a remote location at which it is required or to provide for elevation of the material to a greater height during its passage to the remote location.

A second embodimen of the invention includes a vertically upstanding hopper 31 (FIG. 2) for receiving and containing the mass of material. The material may be loaded into the hopper 31 in any conventional way, such as from opened sacks or from dump vehicles or other well-known methods.

The hopper 31 is of generally rectangular configuration including four downwardly converging upright walls 32 fixedly mounted on the upper surface of a boxlike, generally rectangular housing 34. The interior of the housing 34 is in communication with an interior space defined by the walls 32.

A conveying conduit 35 provided with an internal venturi tube 38 is mounted in and extends horizontally through one vertical side wall of the housing 34 into the interior thereof. A rigid gas conveying conduit 40 connected to a remote source of gas (not shown) is disposed in concentric alignment with the venturi tube and extends outwardly through an opposite vertical wall of the housing 34. A conventional support bracket 36 extends between the gas conduit 40 and adjacent interior portions of the housing 34. At its free end, the gas conduit 40 is provided with a nozzle 42 projecting into the venturi tube 38. The nozzle 42, the venturi tube 38 and the conveying tube 35 are similar to those previously described for the first preferred embodiment, and are disposed in the same relative structural relation.

Two aerating pads 50 (FIG. 3) each generally similar in construction to the previously described aerating pad of the preferred embodiment are mounted on opposite sides of the gas conduit 40 adjacent and spaced upstream of the entry end of the venturi tube 42. The aerating pads 50 are supported in opposite, upwardly and outwardly inclined relation by conventional support structure (not shown) connected to the hopper 31. Each of the aerating pads 50 is connected by a branch airline 52 to a main airline 54 communicating with the previously mentioned gas conduit 35 for supply of air to the aerating pads. A suitable pressure reducing valve 56 is interposed in the main airline 54 for control of the air pressure delivered to the aerating pads 50.

It will be appreciated that the use of the hopper 31 provides a convenient means for loading material in a manner particularly suitable to facilitate subsequent conveying of it to the desired remote location. Further, the sloping walls assist in feeding the material to the gas conveyor.

A third embodiment of the invention illustrated in FIG. 4, includes a hopper 60, conveying conduit 62, venturi tube 64, nozzle 68 and lower housing 70 generally similar in form and in relative positioning to the corresponding structure described for the second embodiment.

The hopper 60, however, is provided with a charging unit intended to assist removal of the material from the hopper to the fluid conveyor. The charging unit includes a hopper floor 72 extending peripherally about the interior of the hopper 60 adjacent the lower end thereof. The floor 72 includes a peripherally extending upper wall 74 of foraminous sheet material extending from the interior of the hopper 60 downwardly and inwardly to an opening 76 positioned centrally of the hopper. A sheet metal throat 78 secured to the upper wall 74 extends vertically downwardly about the opening 76. At its lower end the throat 78 is connected to a downwardly and outwardly flared divergent sheet wall 80. A peripheral wall 82 extending between the free extremities of the top wall 74 and the divergent wall 80 abuttingly contacts the interior of the hopper 60. It will be appreciated that the walls 74, 78, 80 and 82 define a peripherally extending closed chamber 84. Air is supplied through conventional means (not shown) to the interior of the chamber 84 to pass therefrom through the foraminous upper walls 74 for a purpose to be described.

To assist the passage of particulate material out of the hopper 60 through the throat 76, an injector 90 is provided. The injector 90 includes a vertically extending gas conduit 91 provided with a convergent-divergent nozzle 92 at its lower end extending partially into the throat 76. Suitable bracing structure 94 extends between the injector and the hopper for maintaining the position of the injector unit 90. Gas under pressure from a conventional source is applied to the interior of the conduit 91 and provides a downwardly directed gas stream which entrains material from the hopper to assist gravity in moving the particulate material downwardly into the interior of the lower housing 70. The air supplied through the wall 74 replaces interstitial air removed from the material in the hopper, in the manner previously described, and in addition maintains the material in a mobile condition to assist its passage under gravity along the wall 74 down towards the opening 76. As the material enters the lower housing 70, it becomes entrained in the gas stream directed from the nozzle 68 into the venturi tube 64 in the manner previously described, and is carried off down the conveying tube 62. An aerating pad 98, similar to those previously described, is positioned on the base of the lower housing 70 internally thereof in axial alignment with the charging unit 90.

SUMMARY OF ADVANTAGES

It will be appreciated that in following the method and apparatus of the present invention for conveying particulate material, significant advantages are provided.

Particular advantages are provided by the overall combination of a divergent nozzle with a convergent venturi to provide enhanced conveying efficiency free of dead zone problems together with aeration pads to ensure that the enhanced conveying efficiency is not degraded by compaction problems.

Also significant is the use of a divergent gas stream to impinge upon a convergent venturi tube so as to prevent the development of wasted air spaces outside of the gas stream in which entrained material might be permitted to settle out or even be carried backwardly upstream.

Other important advantages are provided by the aerating pads to maintain the mass of particulate material in a non-compacted condition to avoid loss of mobility thereof leading to bridging of the material which could prevent its entry into the conveying conduit.

Another important advantage is provided by the divergent downstream portion of the venturi tube which enables pressure to build up in the gas stream so that the entrained material may be placed under a sufficient pressure head to enable it to be carried away to the desired remote location or, if necessary, to be elevated during such passage.

Although this invention has been described with reference to certain preferred embodiments, it will be appreciated that numerous additions, deletions, substitutions, modifications, and other changes not specifically described may be made which will fall within the purview of the appended claims:

We claim:

1. A method of conveying particulate material from a mass thereof existing in two contiguous regions, one region providing a region of entrainment adjacent a suction zone and the other region, contiguous with said region of entrainment, providing a region of material supplied to the region of entrainment as material in the region of entrainment is conveyed into the suction zone, the material, in its natural state of compaction, having a certain amount of interstitial air between the particles in the mass, the method utilizing a nozzle and a venturi tube with a convergent entry passage of the venturi tube positioned downstream of and facing toward a divergent exit passage of the nozzle, the method comprising the steps of:

passing gas from a source under pressure through the nozzle into the venturi tube to provide a divergent gas stream creating said suction zone intermediate the nozzle and venturi tube, placing a quantity of the particulate material about said entry passage of said venturi tube so as to position said region of entrainment contiguous with and in fluid communication with the suction zone, and to position said region of material supplied to said region of entrainment remote from said suction zone, thereby causing particles of the material in said region of entrainment to be sucked into and entrained in the gas stream, concurrently replacing at least a portion of the interstitial air lost to the suction zone to prevent compaction of the material in the mass at said region of entrainment by supplying a plurality of streams of aerating gas under pressure solely to the portion of the mass of material in the region of entrainment, and passing the gas stream from the suction zone into a downstream divergent portion of the venturi tube to provide a pressure build-up to assist in removal of the entrained material to a subsequent location.

2. A method as defined in claim 1 further including the step of positioning the convergent entry passage in the venturi tube in such spaced relation to the nozzle as to ensure that the diverging gas stream entirely fills the entry passage at some point therein upstream of the divergent exit passage of the venturi tube.

3. A method conveying particulate material as defined in claim 2 wherein the step of supplying a plurality of streams of aerating gas under pressure to the mass of material in the region of entrainment includes positioning a foraminous screen in contact with the stored material in the region of entrainment;

providing a hollow chamber communicating with a side of thes creen remote venturi tube; and supplying air under pressure to the hollow chamber.

4. An apparatus for conveying particulate material from a mass thereof existing in two contiguous regions, one region providing a region of entrainment adjacent a suction zone and the other region, contiguous with said region of entrainment, providing a region of material supplied to the region of entrainment as material in the region of entrainment is conveyed into the suction zone, the material having a certain amount of interstitial air between the particles in the mass, the apparatus utilizing a supply of gas under pressure, the apparatus comprising:

a nozzle having,
        an upstream entry opening adapted for connection to the supply of gas under pressure,
        a divergent exit passage communicating with said entry portion positioned downstream thereof, said exit passage shaped to direct a divergent gas stream downstream of said nozzle;

a venturi tube having,
        an entry passage converging in a downstream direction,
        an exit passage diverging in a downstream direction, said exit passage being in fluid communication with said entry passage positioned downstream thereof;

connecting means connected with said nozzle and said venturi tube for maintaining said venturi tube in fixed relation positioned downstream of said nozzle in axial alignment therewith, said entry passage of said venturi tube being positioned to receive the diverging gas stream from said exit passage of said nozzle to create said suction zone intermediate said nozzle and said venturi tube, said entry passage of said venturi tube further being adapted to be positioned within the quantity of material adjacent said region of entrainment and remote from said region of material supplied to said region of entrainment; and aerating means, adapted to be submerged within the mass of material in said region of entrainment and positioned adjacent and extending at least partially upstream of said entry passage of said venturi tube in fluid communication therewith, to supply a plurality of aerating streams of gas under pressure solely to the portion of the mass of material in said region of entrainment to replace at least a portion of the interstitial air withdrawn by suction into the gas stream preventing compaction thereof.

5. An apparatus as defined in claim 4 wherein said venturi tube further includes, a throat passage communicating with and positioned intermediate said entry and exit passages of said venturi tube, said throat passage being so positioned in relation to said nozzle as to be entirely filled by said diverging gas stream.

6. An apparatus as defined in claim 5 further including, conduit means connected with said exit passage of said venturi tube for conducting the gas stream and entrained material away to a subsequent location.

7. An apparatus as defined in claim 6 wherein said aerating means further includes, at least one aerating pad including,
        a generally sheet-like foraminous member,
        a housing secured to said foraminous member on a side thereof remote from said venturi tube, said housing and said member defining a hollow chamber, and
        air supply means connected with said hollow chamber for supplying air thereto under pressure.

8. An apparatus as defined in claim 7 further including, a vertically extending hopper adapted to receive the mass of material said hopper including
        downwardly and inwardly converging vertical wall means defining an upper chamber,
        a generally rectangular lower housing connected with said wall means adjacent the lower ends thereof defining an enclosed lower chamber communicating with said upper chamber, said entry passage of said venturi tube being positioned within said housing, said nozzle and said venturi tube being disposed generally horizontally, at least two said aeration pads fixedly connected with said walls of said hopper, said aeration pads being positioned on opposite sides of said nozzle inclined upwardly and oppositely outwardly therefrom with portions of said pads positioned adjacent said entry passage of said venturi tube.

9. An apparatus as defined in claim 7 further including, a vertically extending hopper adapted to receive the mass of material, said hopper including,
        upper wall means defining an upper chamber,
        lower wall means fixedly connected with said upper wall means defining an enclosed lower chamber positioned below and communicating with said upper chamber;

said venturi tube being connected with said lower wall means with said entry passage being positioned within said lower chamber, a charging unit positioned in said upper chamber, said charging unit including, a generally horizontal, foraminous wall fixedly secured to said upper wall means extending across said upper chamber with said foraminous wall inclined downwardly and inwardly of said chamber, said foraminous wall further including,
a centrally positioned opening,
a downwardly extending throat wall secured to said foraminous wall about said opening, said throat wall defining,
a throat passage communicating with said lower chamber,
a charger nozzle connected with said upper wall means, said nozzle positioned above and concentric with said throat passage with an annular passage between said nozzle and said throat passage,
first supplying means connected with said nozzle for directing gas downwardly through said throat passage; and
second gas supplying means connected with said foraminous wall for passing gas upwardly therethrough.

References Cited
UNITED STATES PATENTS

| | | | |
|---|---|---|---|
| 1,444,921 | 2/1923 | Hunter | 302—51 |
| 2,011,133 | 8/1935 | Yoss | 302—52 |
| 2,420,388 | 5/1947 | Thomas | 302—25 |
| 3,345,111 | 10/1967 | Bies et al. | 302—52 |

ANDRES H. NIELSEN, Primary Examiner

U.S. Cl. X.R.

302—25